(12) United States Patent  
Ishiwata (10) Patent No.: US 6,748,187 B2
(45) Date of Patent: Jun. 8, 2004

(54) IMAGE FORMING APPARATUS WITH CONVEYANCE AND EXPOSURE CONTROL

(75) Inventor: Kazuhiko Ishiwata, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 10/115,244

(22) Filed: Apr. 4, 2002

(65) Prior Publication Data

US 2002/0150407 A1 Oct. 17, 2002

(30) Foreign Application Priority Data

Apr. 12, 2001 (JP) ........................................ 2001-114655

(51) Int. Cl.$^7$ .............................................. G03G 15/30
(52) U.S. Cl. ...................................... 399/195; 399/394
(58) Field of Search ................................ 399/394, 395, 399/396, 195; 358/1.16, 1.17, 1.12; 347/248, 262, 264; 271/258.01

(56) References Cited

U.S. PATENT DOCUMENTS

| | | | |
|---|---|---|---|
| 4,129,377 A | * 12/1978 | Miyamoto et al. | 399/195 |
| 4,541,711 A | * 9/1985 | Takahashi | 399/394 |
| 5,043,771 A | * 8/1991 | Shibata et al. | 399/396 |
| 5,057,874 A | * 10/1991 | Miyazaki et al. | 399/396 |
| 5,119,146 A | * 6/1992 | Nobumori et al. | 399/396 |
| 5,235,395 A | 8/1993 | Ishiwata | |
| 5,298,958 A | * 3/1994 | Takahashi | 399/43 |
| 5,694,158 A | * 12/1997 | Kato et al. | 347/139 |
| 5,983,066 A | * 11/1999 | Abe et al. | 399/394 |
| 6,026,272 A | 2/2000 | Kusaka et al. | 399/327 |
| 6,342,909 B1 | * 1/2002 | Joichi et al. | 347/129 |
| 6,529,703 B2 | * 3/2003 | Kawasumi et al. | 399/388 |

FOREIGN PATENT DOCUMENTS

| | | | | |
|---|---|---|---|---|
| JP | 56024364 A | * | 3/1981 | G03G/15/00 |
| JP | 60196380 A | * | 10/1985 | B41J/13/00 |
| JP | 62070130 A | * | 3/1987 | B65H/3/44 |
| JP | 08248855 A | * | 9/1996 | G03G/21/14 |
| JP | 2000-281247 | | 10/2000 | |

* cited by examiner

Primary Examiner—Robert Beatty
(74) Attorney, Agent, or Firm—Fitzpatrick, Cella, Harper & Scinto (57) ABSTRACT

The image forming apparatus has exposing device, conveying device, and sheet detecting device for detecting the sheet conveyed by the conveying device, which is disposed between the transferring portion and the conveying device, and control device for judging whether or not it is possible to start exposure by the exposing device before the leading edge of the sheet conveyed by the conveying device reaches the sheet detecting device after the leading edge of the sheet passes through the conveying device and for controlling so that causing the sheet conveyed by the conveying device is stopped in front of the sheet detecting device until it is determined that it is possible to start exposure by the exposing device. In the image forming apparatus, the image forming apparatus starts to form a latent image by the exposing device based on the detection of the sheet by the sheet detecting device.

15 Claims, 5 Drawing Sheets

IMAGE FORMING APPARATUS WITH CONVEYANCE AND EXPOSURE CONTROL

BACKGROUND OF THE INVENTION

1. Field of the Invention

The present invention relates to an image forming apparatus, and more particularly, to control for conveying a sheet when an image formed on an image bearing member is transferred to the sheet.

2. Description of the Related Art

Conventionally, in an image forming apparatus for forming an image on paper, a resin sheet and the like (hereinafter referred to as a sheet) such as a copying machine, an LBP and a facsimile machine, there has been employed an electrophotographic recording system as a recording system in which a sheet is conveyed to a transferring portion, and an image, which is formed by developing a latent image formed on an image bearing member, is transferred to the sheet.

Figure 5:
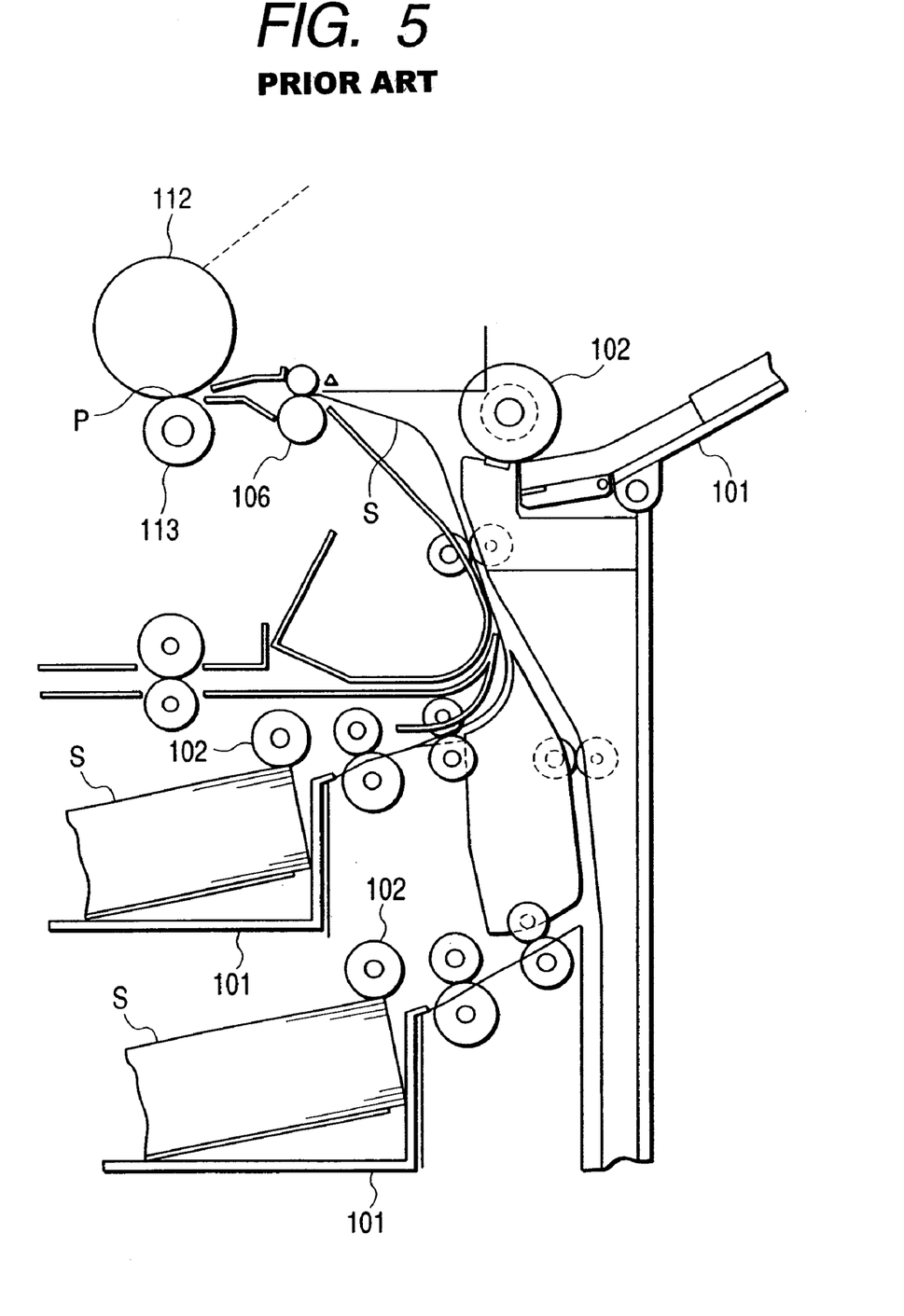
FIG. 5 shows a structure in the vicinity of an image forming portion of an image forming apparatus in accordance with a first related art.

As an image forming apparatus of this type, for example, there is an image forming apparatus that is constituted as shown in FIG. 5. In the image forming apparatus, a registration roller pair 106, which is a pair of skew feeding correcting rollers constituting conveying means, is disposed on the upstream side of a photosensitive drum 112 functioning as an image bearing member, and a sheet S fed from a sheet containing portion 101 by a pick-up roller 102 abuts a nip portion of the registration roller pair 106 in a stopped state to form a loop, whereby skew feeding of the sheet S is corrected.

Further, in such an image forming apparatus, when it is prepared to form an image after skew feeding is corrected, the registration roller pair 106 is rotated in coincided timing with start of exposure on the photosensitive drum 112 to convey the sheet S to a transferring portion P that is constituted by the photosensitive drum 112 and a transferring roller 113. Consequently, a leading edge position of the sheet S and a leading edge position of a toner image on the photosensitive drum 112 are aligned (hereinafter referred to as registration).

However, in such a structure, a state of a sheet leading edge abutting the nip portion may be different depending on a type of a sheet, a state of curl of the leading edge or the like. In such a case, timing for starting to convey the sheet is varied to some extent. As a result, registration cannot be performed successfully in some cases.

Figure 6:
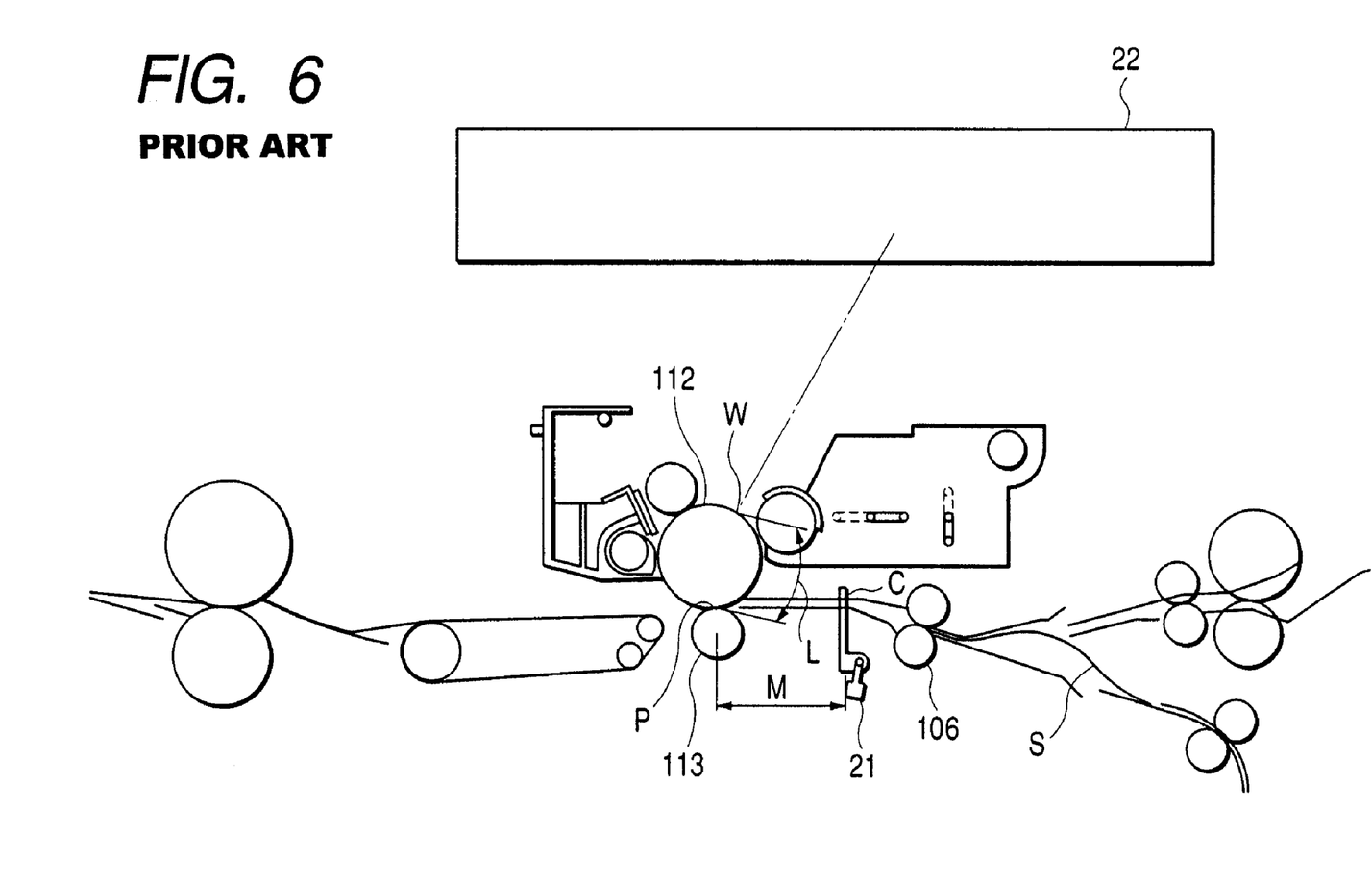
FIG. 6 shows a structure in the vicinity of an image forming portion of an image forming apparatus in accordance with a second related art.

Thus, conventionally, there is an image forming apparatus that is. provided with a sensor 21 functioning as sheet detecting means for detecting the sheet S (hereinafter referred to as a top sensor) disposed between the transferring portion P and the registration roller pair 106 as shown in FIG. 6. In this image forming apparatus, an original image, which has been read by a not-shown image reading portion based on a detection signal from the top sensor 21, is started to be written in the photosensitive drum 112 by a laser unit 22 functioning as exposing means, whereby accuracy of registration is improved.

In this structure, given that L is a developing distance of a drum surface between a drum surface irradiating position (writing position) W, on which a laser beam of the laser unit 22 is irradiated and the transferring portion P, and that M is a distance between a sheet detection position C of the top sensor 21 and the transferring portion P, the top sensor 21 is disposed in a position where a relationship of M>L is established such that a toner image on the photosensitive drum 112 can be surely transferred to the sheet S. As an image forming apparatus constructed in this way, for example, there is one disclosed in Japanese Patent Application Laid-open No. 2000-281247.

However, in the conventional image forming apparatus as shown in FIG. 6, when the leading edge of the sheet S is detected by the top sensor 21 and an original image is started to be written in the photosensitive drum 112 based on the detection signal, the distance M must be secured between the top sensor 21 and the transferring portion P such that the relationship of M>L is established. As a result, a distance of conveying a sheet between the registration roller pair 106 and the transferring portion P becomes longer than that of the image forming apparatus shown in FIG. 5.

In addition, since the sheet S is caused to stand by at the registration roller pair 106 until preparation for writing the original image in the photosensitive drum 112 is finished, when the distance of conveying a sheet between the registration roller pair 106 and the transferring portion P becomes longer, time required for copying (image forming) an image on a first sheet is extended or the number of copies (prints) per unit time is reduced in continuously feeding sheets and forming images on both sides of the sheet S.

Thus, for example, it is possible to feed the sheet by rotation of the registration roller pair 106 before the preparation for writing an original image in the photosensitive drum 112 is finished. However, particularly in a printer used as outputting means of a personal computer or the like which is an example of the image forming apparatus, it is likely that the preparation is not finished until the sheet S reaches the top sensor 21 if an amount of information of an image is large.

As described above, when the distance between the transferring portion P and the registration roller pair 106 becomes longer, time required for copying an image on a first sheet (first copy) is extended and, as a result, the number of copies per unit time is reduced and productivity falls.

SUMMARY OF THE INVENTION

The present invention has been devised in view of the above-mentioned drawbacks, and it is an object of the present invention to provide an image forming apparatus that can improve the productivity.

According to the present invention, there is provided an image forming apparatus including: exposing means for exposing an image bearing member provided in a transferring portion according to image information to form a latent image on the image bearing member; conveying means for conveying a sheet to the transferring portion; and sheet detecting means for detecting the sheet conveyed by the conveying means, which is disposed between the transferring portion and the conveying means, in which the image forming apparatus starts to form a latent image by the exposing means based on the detection of the sheet by the sheet detecting means, and in which the image forming apparatus further includes: control means for judging whether or not it is possible to start exposure by the exposing means before the leading edge of the sheet conveyed by the conveying means reaches the sheet detecting means after the leading edge of the sheet passes through the conveying means and for controlling so that the sheet conveyed by the conveying means is stopped in front of the sheet detecting means until it is determined that it is possible to start exposure by the exposing means.

DESCRIPTION OF THE PREFERRED EMBODIMENTS

Embodiments of the present invention will be hereinafter described in detail with reference to the accompanying drawings.

Figure 1:
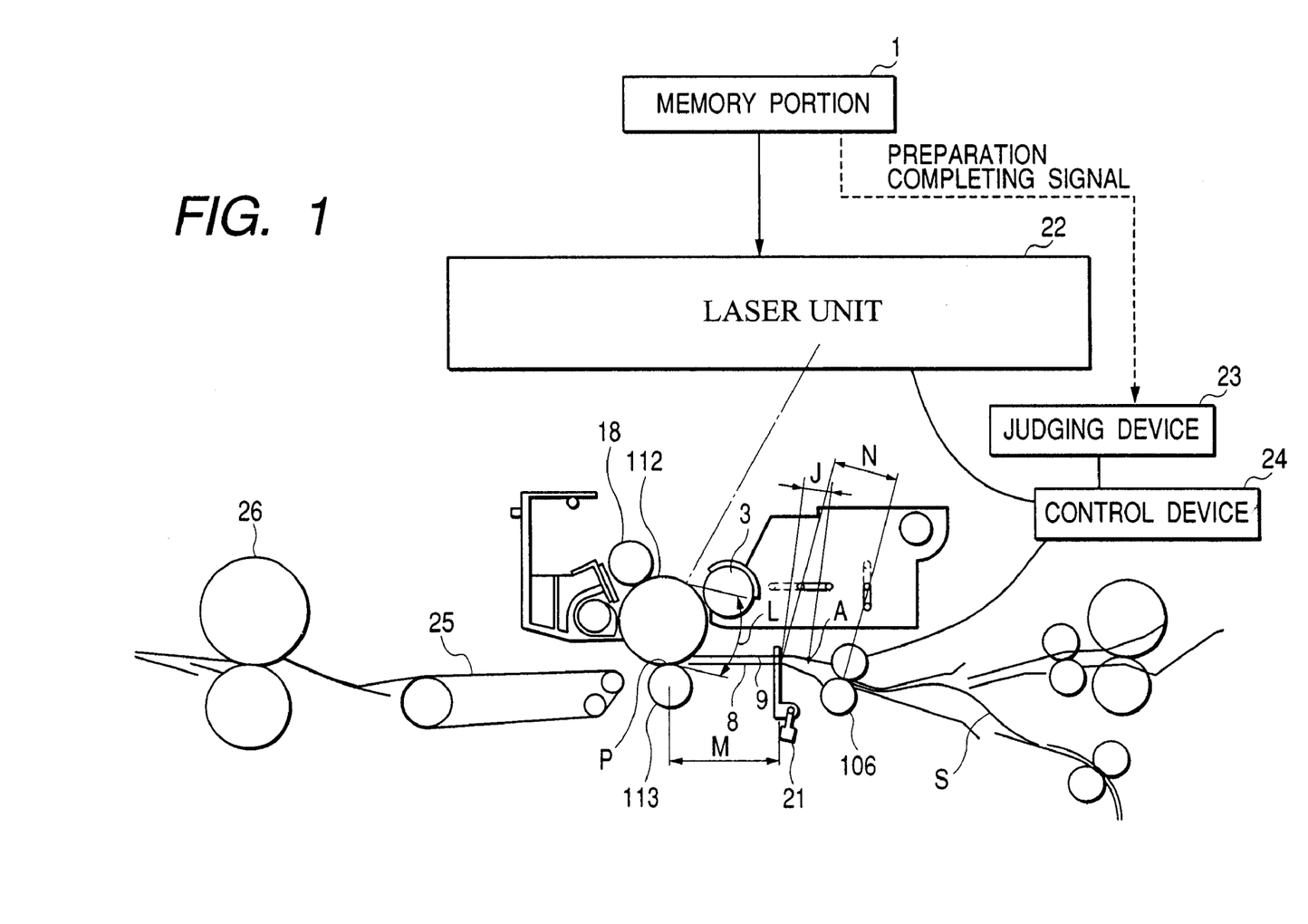
FIG. 1 shows a structure in the vicinity of an image forming portion of a digital copying machine that is an example of an image forming apparatus in accordance with a first embodiment of the present invention.

FIG. 1 shows a structure in the vicinity of an image forming portion of a digital copying machine that is an example of an image forming apparatus in accordance with a first embodiment of the present invention. Note that, in this figure, symbols identical with those in FIG. 6 denote identical or equivalent portions.

In this figure, reference numeral 3 denotes a developing device for developing a latent image formed on the photosensitive drum 112, 18 denotes a charging roller functioning as charging means and 8 and 9 denote a transfer guide pair for guiding a sheet S to a transferring portion P. In addition, reference numeral 26 denotes a fixing device for fixing a toner image on the sheet S and 25 denotes a conveying device for conveying the sheet S from the transferring portion P to the fixing device 26.

In addition, reference numeral 24 denotes a control device functioning as control means for controlling an exposing operation by the laser unit 22 with respect to the surface of the photosensitive drum 112, driving of the registration roller pair 11 and the like by using a signal from a top sensor 21.

In addition, reference numeral 23 denotes a judging device functioning as judging means for judging whether or not it is possible to start exposure by the laser unit 22 based on a signal from a not-shown reader portion functioning as an original reading portion. The judging device 23 judges whether or not it is possible to start exposure by the laser unit 22 in a predetermined judging point indicated by A between the registration roller pair 106 and the top sensor 21 in this figure. For example, a time since a sheet is started to be fed by the registration roller pair 106 (or the number of pulses if a pulse motor is used) is measured, and the judging point A is set at a position where a predetermined time has elapsed.

Further, in this embodiment, the reader portion is provided with a memory portion 1 functioning as a storage portion for sequentially storing image information read by the reader portion. When image information of a predetermined amount, for example, an amount allowing a latent image for a few lines to be formed on the photosensitive drum 112 is stored in this memory 1, a preparation completing signal indicating that it is possible to start exposure by the laser unit 22 is outputted to the judging device 23 in terms of software. In addition, the copying machine in accordance with this embodiment functions as a printer by storing an output signal from a not-shown personal computer in the memory portion 1 of the reader portion.

Moreover, the judging device 23 outputs a signal according to a result of judgment to the control device 24 when the leading edge of the sheet S conveyed by the registration roller pair 106 driven at predetermined timing reaches the judging point A after skew feeding of the sheet is corrected.

That is, when the leading edge of the sheet S reaches the judging point A, if a preparation completing signal is inputted from the reader portion (memory portion 1), the judging device 23 outputs a judgment signal indicating that it is possible to start exposure by the laser unit 22 to the control device 24. The control device 24 continues to drive the registration roller pair 106 without stopping it according to the judgment signal.

On the other hand, if a preparation completing signal is not inputted, that is, if it is determined that it is impossible to start exposure by the laser unit 22, a judgment signal is not outputted until a preparation completing signal is inputted. Then, if a judgment signal is not outputted in this way, the control device 24 temporarily stops driving of the registration roller pair 106. As a result, the sheet S is stopped in front of the top sensor 21.

Incidentally, in the figure, symbol J denotes a distance between the judging point A and the top sensor 21. According to an experiment conducted by the inventors, a value of J is optimal at 3 to 15 mm taking into account a tolerance of each component of the device, an error of accuracy of the sensor and the like.

Next, a copying operation in the digital copying machine thus structured will be described.

First, when a copy button on a not-shown operating portion is pressed, a not-shown reader portion starts to read an original. When image information of an amount allowing a latent image for a few lines to be formed on the photosensitive drum 112 is stored in the memory portion 1 of the reader portion, a preparation completing signal indicating that the laser unit 22 is in a state of capable of starting exposure is transmitted to the judging device 23.

On the other hand, the sheets S stacked on a not-shown sheet stacking portion are separated one by one by a separating mechanism and fed. Thereafter, the sheet S reaches the nip portion of the registration roller pair 106, whereby a loop for correcting skew feeding is formed. Thereafter, the registration roller pair 106 starts to rotate and the sheet S is conveyed to the transferring portion P.

Here, when the leading edge of the sheet S reaches the judging point A, if a preparation completing signal is inputted in the judging device 23, a judgment signal is outputted from the judging device 23. Therefore, the control device 24 continues to drive the registration roller pair 106 and the sheet S thereby continues to be conveyed.

Thereafter, when the leading edge of the sheet S is detected by the top sensor 21, on the basis of the detecting signal, the control device 24 controls such that a laser beam is irradiated on the photosensitive drum 112 that is uniformly charged by the charging roller 18 (the photosensitive drum 112 is exposed to the laser beam) and a latent image is formed. Next, the latent image is developed by the developing device 3 and a toner image is formed on the photosensitive drum 112. The toner image is transferred to the sheet S in the transferring portion P. Thereafter, the sheet S is conveyed to the fixing device 26 by the conveying device 25, which makes the toner image fixed thereon and, then, discharged to the outside by a not-shown sheet discharging device.

On the other hand, when the sheet S reaches the judging point A, if a preparation completing signal is not inputted in the judging device 23, that is, if the image forming apparatus is not prepared to form an image, a judgment signal is not outputted from the judging device 23. Thus, the control device 24 immediately stops driving the registration roller pair 106 to stop conveying the sheet S and causes it to stand by until the image forming apparatus is prepared to form an image.

Then, when a preparation completing signal is inputted, the judging device 23 outputs a judgment signal and the control device 24 immediately drives the registration roller pair 106 to resume conveying the sheet S based on this judgment signal. The following processing is carried out in the same manner as the above-mentioned process of the registration.

In this way, the judging device 23 for determining whether or not it is possible to start exposure by the laser unit 22 is provided, it is determined whether or not it is possible to start exposure by the laser unit 22 and, if it is not possible to start exposure, the sheet S conveyed by the registration roller pair 106 is temporarily stopped in front of the top sensor 21 until it becomes possible to start exposure, whereby the sheet S can be caused to stand by in a position close to the transferring portion 20 in advance in starting exposure. Thus, decrease of productivity that is conventionally caused by conveying the sheet S again from the registration roller pair 106 can be prevented and registration can be performed successfully.

In addition, as described above, the sheet S is temporarily stopped until it becomes possible to start exposure only if it is not possible to start exposure, for example, an amount of information of an image is large, and thus registration can be successfully performed even if the registration roller pair 106 is disposed close to the upstream side in the sheet conveying direction of the top sensor 21.

As a result, a copy time for a first sheet (first copy time) of an image with an ordinary amount of information can be reduced and, at the same time, the number of copies per unit time can be increased in continuous sheet feeding, whereby productivity can be improved. Further, according to this embodiment, there is an effect of reducing a first copy time by approximately 3% compared with the conventional image forming apparatus of the structure shown in FIG. 6.

Next, a second embodiment of the present invention will be described.

Figure 2:
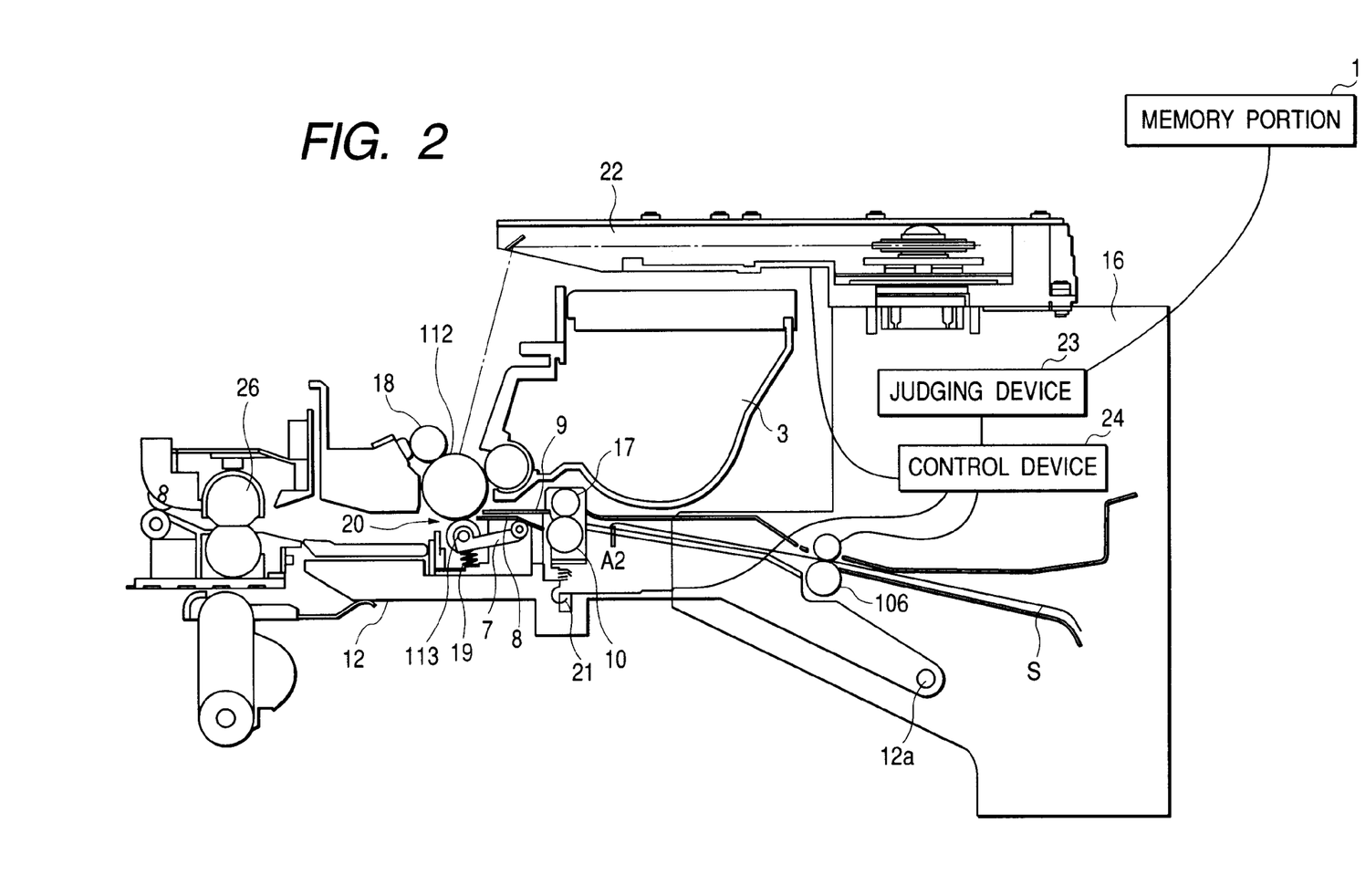
FIG. 2 shows a structure in the vicinity of an image forming portion of a digital copying machine that is an example of an image forming apparatus in accordance with a second embodiment of the present invention.

FIG. 2 shows a structure in the vicinity of an image forming portion of a digital copying machine that is an example of an image forming apparatus in accordance with this embodiment. Note that, in this figure, the same symbols as those in FIG. 1 denote identical or equivalent portions.

In this figure, reference numeral 7 denotes a transfer arm for supporting the transferring roller 113, and 19 denotes a spring. The transferring roller 113 is biased to the photosensitive drum 112 via the transfer arm 7 and the spring 19 at a predetermined pressure.

In addition, reference numeral 20 denotes a transferring portion constituted by the transferring roller 113 and the photosensitive drum 112, and 10 denotes a pre-transfer roller pair functioning as supplementary conveying means for conveying the sheet S to the transferring portion 20. The pre-transfer roller pair 10 is axially supported so as to be rotatable on a roller stand 17 attached to the transfer guide pair 8 and 9 for guiding the sheet S to the transferring portion 20.

Incidentally, it is necessary to set a roller pressure so as to be high, i.e., approximately 19.6 N (2 kgf) or more in order to correct skew feeding and convey the sheet S to the photosensitive drum 112. For this purpose, the registration roller pair 106 is generally supported rotatably on a front plate 16 and a not-shown back plate.

Here, in order to effectively carry out jam processing in the transferring portion 20 with the above-mentioned structure, the pre-transfer roller pair 10 is attached to a conveying frame 12 that is swingably supported by a fulcrum 12a provided in the not-shown back plate. Further, the pre-transfer roller pair 10 is set to pressure more lightly than the registration roller pair 106.

In addition, according to such a structure, the conveying frame 12 is swung downward when jam occurs in the transferring portion 20, whereby a conveying path can be opened between the photosensitive drum 112 and the transferring roller 113. In this way, the space in the vicinity of the transferring roller 113 can be wide, whereby it becomes possible to improve a jam treating property in the transferring portion 20.

Incidentally, since a distance of conveying a sheet between the registration roller pair 106 and the transferring portion 20 increases in such a structure, it is likely that a time required for the first copy becomes longer or the number of copies per unit time decreases and, as a result, decrease of productivity occurs. This problem can be effectively eliminated by this embodiment. This will be described below.

The pre-transfer roller pair 10 and the photosensitive drum 112 are driven by a not-shown identical driving source, whereby a conveying speed of the pre-transfer roller pair 10 is always identical with a process speed. In addition, as shown in this figure, the top sensor 21 is disposed between the pre-transfer roller pair 10 and the transferring portion 20.

On the other hand, in this figure, symbol A2 denotes a judging point that is set in the same manner as the first embodiment. The judging device 23 outputs a judgment signal to the control device 24 if a preparation completing signal is inputted from the reader portion (memory portion 1) when the leading edge of the sheet S conveyed by the registration roller pair 106 driven at predetermined timing reaches the judging point A2 after skew feeding of the sheets is corrected. The control device 24 continues to drive the registration roller pair 106 according to this judging signal.

Figure 3:
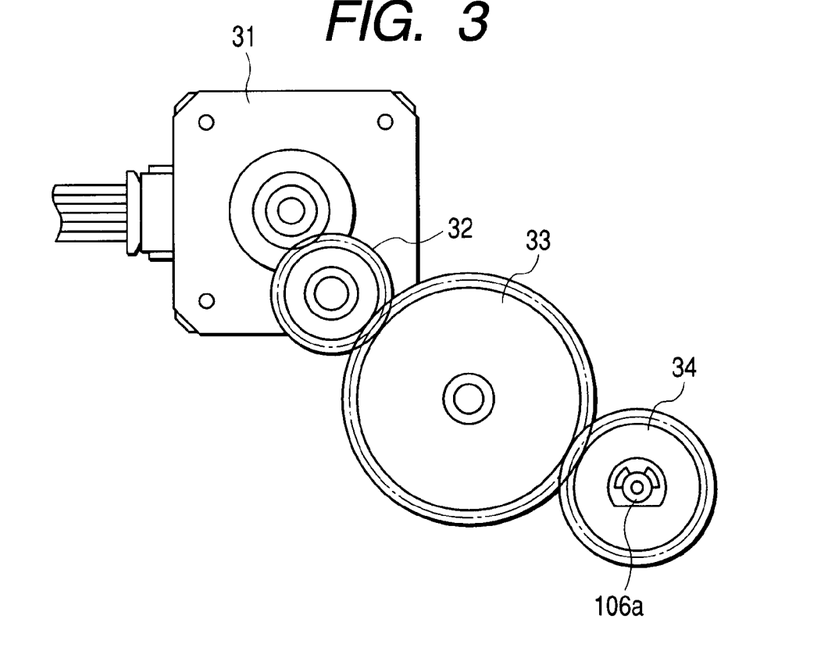
FIG. 3 shows a driving portion of a registration roller pair of the digital copying machine.

Further, reference numeral 16 denotes a front plate. The registration roller pair 106 is axially supported by the front plate 16 and a not-shown back plate that is disposed substantially parallel with the front plate 16. Here, FIG. 3 shows a driving portion of the registration roller pair 106. Further, this driving portion is attached to a rear side of the image forming apparatus by the not-shown back plate.

In this figure, reference numeral 34 denotes a gear fixedly attached to a registration roller shaft 106a, 31 denotes a stepping motor controlled to be driven by the control device 24. Rotation of the stepping motor 31 is transmitted to the registration roller pair 106 via a step gear 32, an idler gear 33 and this gear 34. Further, this stepping motor 31 rotates at a speed corresponding to an input signal from the control device 24.

Next, a copying operation in the digital copying machine structured as described above will be described.

When a copy button on a not-shown operating portion is pressed, the photosensitive drum 112 is uniformly charged by the charging roller 18, and then, a laser beam is irradiated on the photosensitive drum 112 according to image information, whereby a latent image is formed thereon. Next, this latent image is developed using toner by the developing device 3.

On the other hand, the sheets S stacked on a not-shown sheet stacking portion are separated one by one by a separating mechanism and fed. Thereafter, the sheet S reaches the nip portion of the registration roller pair 106, whereby a loop for correcting skew feeding is formed. Thereafter, the registration roller pair 106 starts to rotate by the rotation of the stepping motor 31 and the sheet S is conveyed to the pre-transfer roller pair 10.

Figure 4:
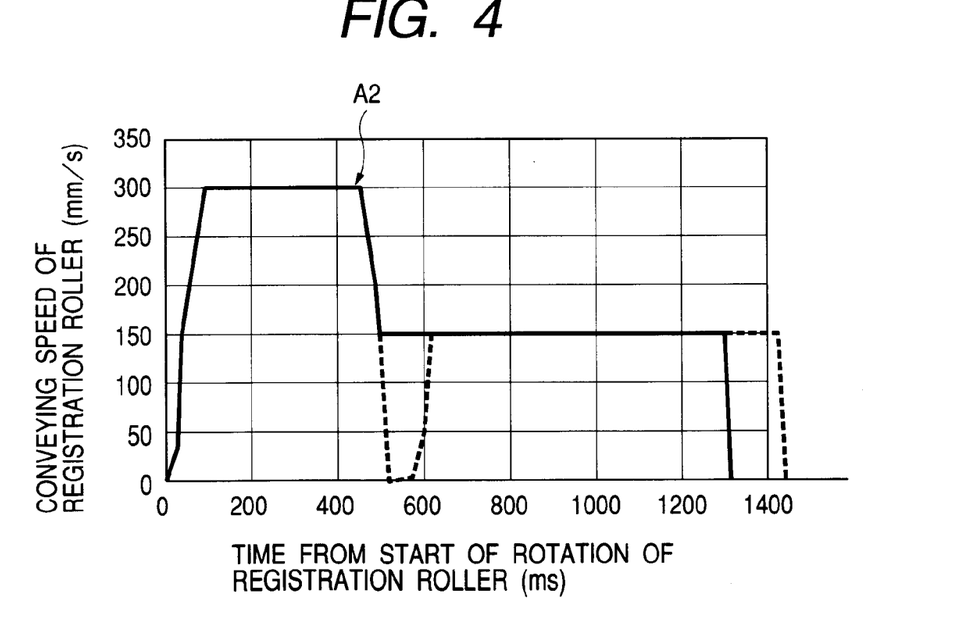
FIG. 4 shows control of a stepping motor for driving the registration roller pair.

At this point, the stepping motor 31 gradually increases a speed at a fixed acceleration from a stopped state (up slowly (slow-up)) as shown by a solid line of FIG. 4 and accelerates up to a speed twice as high as a process speed. Thereafter, the stepping motor 31 conveys the sheet S at this speed.

Thereafter, when the leading edge of the sheet S reaches a predetermined position (the judging point A2 shown in FIG. 2), the stepping motor 31 gradually reduces a speed at a fixed deceleration (down slowly) as shown by a solid line of the figure.

Here, when the leading edge of the sheet S reaches the judging point A2, if a preparation completing signal is inputted in the judging device 23 from the reader portion (memory portion 1), a judging signal is outputted from the judging device 23. Therefore, the control means 24 continues to cause the stepping motor 31 to reduce a speed and reduces the conveying speed of the sheet S to a process speed at approximately 10 mm in front of the pre-transfer roller pair 10. Further, the conveying speed of the pre-transfer roller pair 10 is always identical with the process speed.

Then, when the trailing edge of the sheet S passes through the registration roller pair 106, the stepping motor 31 stops and the registration roller pair 106 also stops. Further, since the registration roller pair 106 rotates at the process speed until the trailing edge of the sheet S passes through it, the pre-transfer roller pair 10 never becomes a resistance against conveying the sheet S.

On the other hand, when the sheet S reaches the judging point A2, if a preparation completing signal is not inputted in the judging device 23, the stepping motor 31 continues to down slowly by the control means 24 as shown by an dashed line of FIG. 4 and stops. Consequently, the sheet S temporarily stops in front of the pre-transfer roller pair 10 and stands by until the image forming apparatus is prepared to form an image, that is, a preparation completing signal is inputted in the judging device 23.

Then, thereafter, no sooner is a preparation completing signal inputted in the judging device 23 than the stepping motor 31 gradually increases a speed at a fixed acceleration (up slowly). As a result, the sheet S starts to be conveyed at the process speed.

Thereafter, the sheet S is conveyed to the more downstream side than the pre-transfer roller pair 10. When the sheet S is detected by the top sensor 21, exposure of the photosensitive drum 112 is started by the control of the control means 24 based on the detecting. Then, a toner image formed on the photosensitive drum 112 is transferred to the sheet S by the transferring roller 113 in coincided timing with the leading edge of the sheet S.

The sheet S on which the unfixed toner image is transferred is conveyed to the more downstream side, and the toner image is fixed thereon by the fixing device 26. Thereafter, the sheet S is discharged to the outside by a discharge roller.

In this way, since it is determined whether or not it is possible to start exposure by the laser unit 22 before the sheet S reaches the pre-transfer roller pair 10 based on a result of judgment of the judging device 23, the sheet S is temporarily stopped until it becomes possible to start exposure only if it is not possible to start exposure, whereby it becomes possible to cause the sheet S to stand by in a position close to the transferring portion 20 in advance in starting exposure. As a result, decrease of productivity that is conventionally caused by conveying the sheet S again from the registration roller pair 106 can be prevented and registration can be performed successfully.

Moreover, in this embodiment, a first copy time can be further reduced and the number of copies per unit time can be increased by combination with the reduction of time by a slow-up conveyance in the registration roller pair 106, whereby productivity can be further improved.

Note that, according to this embodiment, approximately 10% reduction of a speed becomes possible in terms of a first copy time compared with the conventional image forming apparatus disclosed in Japanese Patent Application Laid-open No. 2000-281247 referred to earlier.

In addition, although the top sensor 21 is arranged on the downstream side of the pre-transfer roller pair 10 in this embodiment, it may be disposed on the upstream side of the pre-transfer roller pair 10 according to the developing distance L of an image on the photosensitive drum 112.

Thus, it is seen that an image forming apparatus is provided. One skilled in the art will appreciate that the present invention can be practiced by other than the preferred embodiment which is presented for the purposes of illustration and not of limitation, and the present invention can be modified in any way within the technical thoughts of the present invention.

What is claimed is:

1. An image forming apparatus comprising:

exposing means for exposing an image bearing member according to image information to form a latent image on said image bearing member;

conveying means for conveying a sheet to a transferring portion; and sheet detecting means for detecting the sheet conveyed by said conveying means, which is disposed between said transferring portion and said conveying means; and control means for judging whether or not it is possible to start exposure by said exposing means before a leading edge of the sheet conveyed by said conveying means reaches said sheet detecting means after the leading edge of the sheet passes through said conveying means and for controlling so that the sheet conveyed by said conveying means is stopped at a judging position between said conveying means and said sheet detecting means until it is determined that it is possible to start exposure by said exposing means, wherein said conveying means again conveys the sheet stopped at the judging position based on the judgment of the control means, and said exposing means starts to expose the latent image on said image bearing member based on a detection of the sheet conveyed from said judging position, by said sheet detecting means.

2. An image forming apparatus according to claim 1, wherein said control means includes a storing portion for storing said image information, and judging means for outputting a judgment signal indicating that it becomes possible to start exposure by said exposing means when a predetermined amount of image information is stored in said storing portion, and controls said conveying means based on the output from said judging means when the leading edge of the sheet conveyed by said conveying means reaches the judging position between said conveying means and said sheet detecting means.

3. An image forming apparatus according to claim 2, wherein, based on a judgment signal of said judging means, said control means controls said conveying means to temporarily stop the sheet, if it is no possible to start exposure by said exposing means when the leading edge of the sheet conveyed by said conveying means reaches said judging position, and to convey the stopped sheet again when exposure is started, and controls said conveying means to continue to convey the sheet without stopping it if it is already possible to start exposure by said exposing means when the leading edge of the sheet conveyed by said conveying means reaches said judging position.

4. An image forming apparatus according to claim 3, wherein the latent image formed on said image bearing member is developed by developing means to form a toner image and transfers the toner image to the conveyed sheet by transferring means, and
wherein said control means controls said conveying means to convey the sheet until the leading edge of the sheet reaches said judging position at a sheet conveying speed faster than that at which the sheet is conveyed when an image is transferred to the sheet by said transferring means.

5. An image forming apparatus according to claim 4, wherein said conveying means is driven by a stepping motor, and said controlling means controls a sheet conveying speed of said conveying means by controlling rotation of said stepping motor.

6. An image forming apparatus according to claim 4, further comprising supplementary conveying means for conveying the sheet conveyed by said conveying means to said transferring portion, which is provided on a downstream side of said judging position between said conveying means and said transferring portion,
wherein said supplementary conveying means conveys the sheet at substantially the same speed as the conveying speed of the sheet at the time when an image is transferred to the sheet by said transferring means.

7. An image forming apparatus according to claim 3, wherein said conveying means is a skew feeding correcting roller for correcting skew feeding of a sheet by forming a loop in the sheet with the leading edge of the sheet abutting said conveying means in a stopped state.

8. An image forming apparatus according to claim 3, wherein said conveying means is disposed near an upstream side in a sheet conveying direction of said sheet detecting means.

9. An image forming apparatus according to claim 3, further comprising supplementary conveying means for conveying the sheet conveyed by said conveying means to said transferring portion, which is disposed between said conveying means and said transferring portion.

10. An image forming apparatus comprising:
a laser unit for exposing an image bearing member according to image information to form a latent image on said image bearing member;
a conveying roller for conveying a sheet to a transferring portion; and
a top sensor for detecting the sheet conveyed by said conveying roller, which is disposed between said transferring portion and said conveying roller; and
a judging device for judging whether or not it is possible to start exposure by said laser unit before a leading edge of the sheet conveyed by said conveying roller reaches said top sensor after the leading edge of the sheet passes through said conveying roller; and
a control device for controlling so that the sheet conveyed by said conveying roller is stopped at a judging position between said conveying roller and said top sensor until it is determined that it is possible to start exposure by said laser unit,
wherein said conveying roller again conveys the sheet stopped at the judging position, based on the judgment of the judging device, and said laser unit starts to expose the latent image on said image bearing member based on a detection of the sheet conveyed from said judging position, by said top sensor.

11. An image forming apparatus according to claim 10, further comprising a memory portion in which image information is stored, wherein said memory portion outputs a signal indicating preparation completing to said judging device when a predetermined amount of image information is stored therein, and said judging device determines that it is possible to start exposure by said laser unit when a preparation completing signal is inputted from said memory portion.

12. An image forming apparatus according to claim 10, wherein, based on a judgment of said judging device, said control device controls said conveying roller to temporarily stop the sheet, if it is not possible to start exposure by said laser unit when the leading edge of the sheet conveyed by said conveying roller reaches said judging position, and to again convey the stopped sheet when exposure is started, and said control device controls said conveying means to continue to convey the sheet without stopping it if it is already possible to start exposure by said laser unit when the leading edge of the sheet conveyed by said conveying roller reaches said judging position.

13. An image forming apparatus according to claim 10, wherein the latent image formed on said image bearing member is developed by developing means to form a toner image and transfers the toner image to the conveyed sheet by transferring means, and
wherein said control device controls said conveying means to convey the sheet until the leading edge of the sheet reaches said judging position at a sheet conveying speed faster than at which the sheet is conveyed when an image is transferred to the sheet by said transferring means.

14. An image forming apparatus comprising:
exposing means for exposing an image bearing member according to image information to form a latent image on said image bearing member;
conveying means for conveying a sheet to a transferring portion; and
sheet detecting means for detecting the sheet conveyed by said conveying means, which is disposed between said transferring portion and said conveying means; and
control means for judging whether or not it is possible to start exposure by said exposing means before a leading edge of the sheet conveyed by said conveying means reaches said sheet detecting means after the leading edge of the sheet passes through said conveying means and for controlling said conveying means to temporarily stop the sheet at a judging position, if it is not possible to start exposure by said exposing means when the leading edge of the sheet conveyed by said conveying means reaches said judging position, and to again convey the stopped sheet when exposure is started, and for controlling said conveying means to continue to convey the sheet without stopping it if it is already possible to start exposure by said exposing means when the leading edge of the sheet conveyed by said conveying means reaches said judging position.

15. An image forming apparatus according to claim 14, wherein the latent image formed on said image bearing member is developed by developing means to form a toner image and transfers the toner image to the conveyed sheet by transferring means, and wherein said control means controls said conveying means to convey the sheet until the leading edge of the sheet reaches said judging position at a sheet conveying speed faster than at which the sheet is conveyed when an image is transferred to the sheet by said transferring means.

* * * * *

UNITED STATES PATENT AND TRADEMARK OFFICE
CERTIFICATE OF CORRECTION

PATENT NO. : 6,748,187 B2
DATED : June 8, 2004
INVENTOR(S) : Kazuhiko Ishiwata

It is certified that error appears in the above-identified patent and that said Letters Patent is hereby corrected as shown below:

Title page,
Item [56], References Cited, FOREIGN PATENT DOCUMENTS, "56024364" should read -- 56-024364 --; "60196380" should read -- 60-196380 --; "62070130" should read -- 62-070130 --; and "08248855" should read -- 08-248855 --.

Column 1,
Line 50, "is." should read -- is --.

Column 4,
Line 45, "of" (1st occurrence) should be deleted.

Column 6,
Line 41, "as" should read -- as in --.

Column 7,
Line 46, "down" should read -- decelerate --; and "an" should read -- a --.

Column 8,
Line 34, "by" should read -- by embodiments --.
Line 45, "and" should be deleted.

Column 9,
Line 13, "no" should read -- not --.

Column 10,
Lines 2, 5 and 61, "and" should be deleted.

Signed and Sealed this

Thirty-first Day of August, 2004

JON W. DUDAS
*Director of the United States Patent and Trademark Office*